US006362949B1

(12) United States Patent
Takashima et al.

(10) Patent No.: US 6,362,949 B1
(45) Date of Patent: Mar. 26, 2002

(54) LAMINATED CERAMIC ELECTRONIC COMPONENT

(75) Inventors: Hiroaki Takashima, Sabae; Yasunobu Yoneda, Takefu, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/563,684

(22) Filed: May 3, 2000

(30) Foreign Application Priority Data

May 10, 1999 (JP) .......................................... 11-127965

(51) Int. Cl.[7] ............................ H01G 4/06; H01G 4/20; C03C 1/00; C03C 14/00

(52) U.S. Cl. ...................... 361/321.4; 361/320; 501/32; 501/135

(58) Field of Search ............................. 361/320, 321.1, 361/321.2, 321.4, 321.5; 501/32, 135

(56) References Cited

U.S. PATENT DOCUMENTS 3,256,499 A * 6/1966 Khouri et al. ............. 333/184
3,757,177 A * 9/1973 Buehler ...................... 317/258
5,204,301 A * 4/1993 Ohkubo et al. ............ 501/136
5,756,408 A * 5/1998 Terashi et al. ................. 501/8
5,801,108 A * 9/1998 Huang et al. ................. 501/32
6,072,688 A * 6/2000 Hennings et al. ........... 361/311
6,096,672 A * 8/2000 Kim et al. .................. 501/135
6,118,648 A * 9/2000 Kojima et al. ............. 361/311

* cited by examiner

*Primary Examiner*—Anthony Dinkins
*Assistant Examiner*—Eric W. Thomas
(74) *Attorney, Agent, or Firm*—Ostrolenk, Faber, Gerb & Soffen, L.L.P.

(57) ABSTRACT

A laminated ceramic electronic component using a ceramic sintered body mainly comprising $CaZrO_3$, which can be fired in a neutral or reducing atmosphere at a low temperature and in which inner electrodes are formed using cheap base metals. The inner electrodes Ni are disposed so as to be stacked via a ceramic layer in the ceramic sintered body having a principal component of $CaZrO_3$ and containing a $MnO_2$ phase and a glass phase, and forming outer electrodes on the outer surfaces of the ceramic sintered body.

15 Claims, 1 Drawing Sheet

LAMINATED CERAMIC ELECTRONIC COMPONENT

BACKGROUND OF THE INVENTION

1. Field of the Invention

The present invention relates to a laminated ceramic electronic component such as a laminated capacitor. In more detail, the present invention relates to a laminated ceramic electronic component using a ceramic sintered body having a principal component of $CaZrO_3$ suitable for temperature compensation.

2. Description of the Related Art

Use of base metals such as Ni and Cu as inner electrodes have been attempted for reducing the production cost of laminated ceramic electronic components such as laminated capacitors. However, since these base metals are readily oxidized, laminated ceramic green sheets having inner electrodes as described above have required firing in a neutral or reducing atmosphere. Accordingly, ceramic materials capable of being fired under the neutral or reducing atmosphere, for example a ceramic mainly composed of $BaTiO_3$, have been widely used for manufacturing such laminated ceramics.

Meanwhile, a variety of laminated capacitors for use in temperature compensation have been proposed as elements for use in temperature compensation. Ceramics to be used in the laminated capacitors for use in temperature compensation are required to have a small rate of temperature change of electrostatic capacitance. Accordingly, $CaZrO_3$ based ceramics have been used as the ceramic materials constituting the laminated ceramic capacitor for use in temperature compensation.

The $CaZrO_3$ based ceramics are suitable for the materials of the temperature compensation ceramics because their specific dielectric constant is low and they have a smaller rate of temperature change of electrostatic capacitance than $BaTiO_3$ based ceramics.

However, the $CaZrO_3$ based ceramics require a firing temperature as high as about 1400° C. as compared with the lower firing temperature of the $BaTiO_3$ based ceramics, making it difficult to fire in a neutral or reducing atmosphere, and therefore the $CaZrO_3$ based ceramics have been usually fired in the air. As a result, expensive inner electrode materials such as Pd, which are hardly oxidized even by firing in the air, have been inevitably used for the $CaZrO_3$ based ceramics. Consequently, it was difficult to reduce the manufacturing cost because a large amount of energy has been needed due to the high firing temperature, and the materials for the inner electrodes are expensive.

SUMMARY OF THE INVENTION

Accordingly, the object of the present invention is to provide a laminated ceramic electronic component using $CaZrO_3$ based ceramics that can be fired in a neutral or reducing atmosphere, thereby allowing inner electrodes to be formed using cheap base metals such as Ni.

The present invention provides a laminated ceramic electronic component comprising: a ceramic sintered body having a principal component of $CaZrO_3$ and containing a $MnO_2$ phase and a glass phase; inner electrodes comprising a base metal disposed in the ceramic sintered body; and outer electrodes formed on the outer surface of the ceramic sintered body.

In the laminated ceramic electronic component according to the present invention, a ceramic sintered body having a principal component of $CaZrO_3$ in which a $MnO_2$ phase is formed is used. The $MnO_2$ phase serves for stabilizing the ceramic sintered body when firing in a neutral or reducing atmosphere.

The ceramic sintered body containing the glass phase can be obtained by sintering at a temperature as low as 1250° C. or less.

Accordingly, it is possible to use inner electrodes comprising a base metal, such as Ni and Cu, because the $CaZrO_3$ based ceramics having a small rate of temperature change of electrostatic capacitance is obtained by firing at a relatively low temperature in a neutral or reducing atmosphere.

Preferably, the ceramic sintered body further comprises a $TiO_2$ phase in the present invention.

Ni or Cu may be used for the base metal constituting the inner electrodes in the present invention.

The laminated ceramic electronic component comprising the ceramic sintered body mainly composed of the $CaZrO_3$ based ceramics according to the present invention may be advantageously used for the laminated capacitor for use in temperature compensation.

DESCRIPTION OF THE PREFERRED EMBODIMENT

Figure 1:
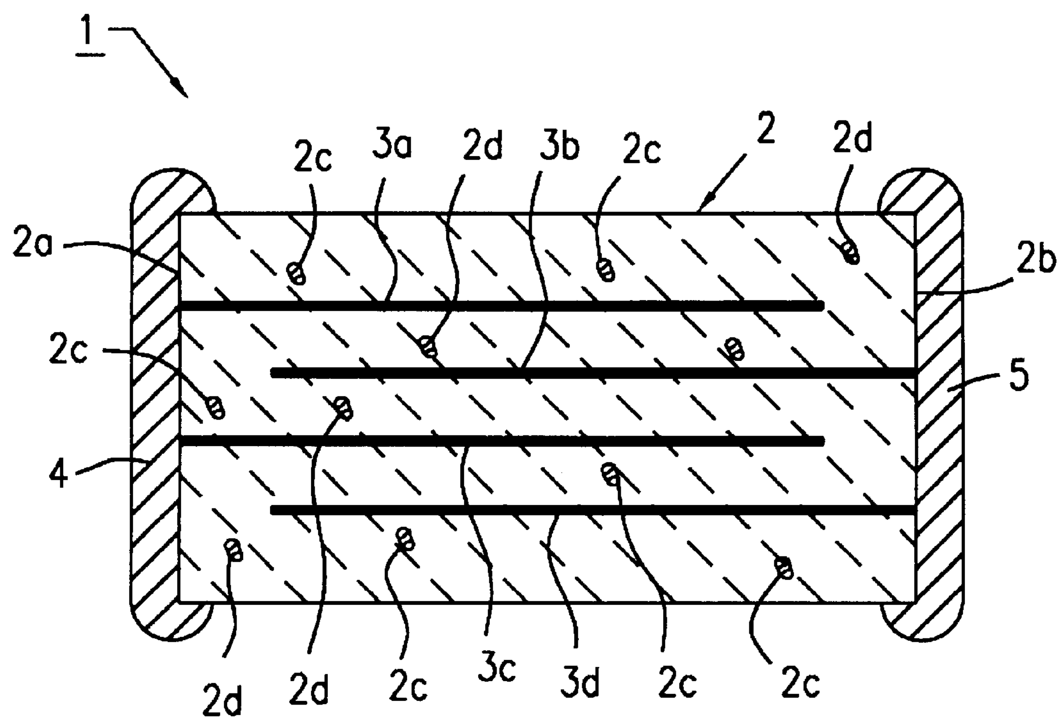
FIG. 1 shows a cross section of the laminated capacitor as a laminated ceramic electronic component according to one embodiment of the present invention.

The present invention will be elucidated by describing one embodiment of the present invention with reference to the drawing.

FIG. 1 shows a cross section of a laminated capacitor according to one embodiment of the present invention.

The laminated capacitor 1 has a ceramic sintered body 2. A plurality of inner electrodes 3*a* to 3*d* are disposed so as to be stacked in the ceramic sintered body 2 via ceramic layers. Outer electrodes 4 and 5 are formed so as to cover the end faces 2*a* and 2*b* of the ceramic sintered body 2.

The laminated capacitor 1 of this embodiment is featured in that the ceramic sintered body 2 has a main component of $CaZrO_3$ while containing $MnO_2$ phases 2*c* and glass phases 2*d*. The $MnO_2$ phase 2*c* prolongs high temperature service life in addition to enabling the capacitor to be stabilized when fired in a neutral or reducing atmosphere, as will be made clear in the experimental examples to be described hereinafter. The glass phase 2*d* allows the capacitor to be fired at a relatively low temperature. Consequently, a cheap base metal such as Ni and Cu may be used for the inner electrodes 3*a* to 3*d*.

The starting materials and methods for forming the outer electrodes 4 and 5 are not particularly restricted, and any methods including coating and firing of an Ag paste, vapor deposition of Ag or other metals, or thin film deposition methods such as plating or sputtering may be used.

A powder of a Mn compound, such as $MnCO_3$, that is able to form the $MnO_2$ phase after firing may be added to the ceramic material prior to firing of the ceramic sintered body 2 in forming the $MnO_2$ phase. The $TiO_2$ phase may be formed by adding a Ti compound, such as $SrTiO_3$, that is able to form the $TiO_2$ phase after firing in the ceramic material.

The quantity of $MnO_2$ phase, glass phase and $TiO_2$ phase, when present, can be adjusted as desired to achieve the desired characteristics of the ceramic. In general, the amount of the $MnO_2$ phase is about 0.5 to 1.5%, the glass phase is up about 0.5%, and the $TiO_2$ phase is about 0.5 to 1.5% based on the weight of the $CaZrO_3$, although other amounts can be used if desired.

EXAMPLE 1

A slurry was obtained by adding 1 part by weight of $MnCO_3$ and 0.1 parts by weight of a Li—Si based glass relative to 100 parts by weight of $CaZrO_3$ followed by kneading a solvent binder. The slurry was formed into a sheet to obtain a ceramic green sheet with a thickness of 0.1 $\mu$m. A Ni paste was coated on one face of the ceramic green sheet. After drying the paste, a plurality of ceramic green sheets on which inner electrodes comprising the Ni paste were printed were laminated followed by laminating plain ceramic green sheets on the top and bottom layers to obtain a laminated body. After pressing the laminated body along the direction of thickness, it was fired in a reducing atmosphere with a partial pressure of oxygen of $4\times10^{-10}$ MPa while maintaining a firing temperature of 1250° C. for 2 hours. Outer electrodes were formed on both side faces of the ceramic sintered body obtained.

A laminated capacitor comprising 80 sheets of the inner electrode layers, and having a dimension of 3.2 mm×1.6 mm×1.6 mm and a design capacitance of 10 nF, was obtained.

EXAMPLE 2

A laminated capacitor was obtained by the same method as in Example 1, except that the ceramic slurry was prepared by further adding 1 part by weight of $SrTiO_3$ relative to 100 parts by weight of $CaZrO_3$.

EXAMPLE 3

A laminated capacitor was obtained by the same method as in Example 1, except that the ceramic slurry was prepared by further adding 0.8 part by weight of $SrTiO_3$ relative to 100 parts by weight of $CaZrO_3$.

Comparative Example 1

A ceramic slurry was obtained by the same method as in Example 1, except that $MnCO_3$ and Li—Si based glass were not added in preparing the ceramic slurry. A laminated capacitor was obtained by the same method as in Example 1.

Comparative Example 2

A ceramic slurry was obtained by the same method as in Example 1, except that $MnCO_3$ was not added in preparing the ceramic slurry. A laminated capacitor was obtained by the same method as in Example 1.

The compositions of the sintered bodies in the examples and in the comparative examples are listed in TABLE 1.

TABLE 1

| | EXAMPLE | | | COMPARATIVE EXAMPLE | |
|---|---|---|---|---|---|
| MATERIAL | 1 | 2 | 3 | 1 | 2 |
| $CaZrO_3$ | 100 | 100 | 100 | 100 | 100 |
| $SrTiO_3$ | 0 | 1.0 | 0.8 | 0 | 0 |
| $MnCO_3$ | 1.0 | 1.0 | 1.0 | 0 | 0 |
| Li-Si BASED GLASS | 0.1 | 0.1 | 0.1 | 0 | 0.1 |

Evaluation of the laminated capacitors manufactured in examples and comparative examples Electrostatic capacitance, Q-value, and insulation resistance (log IR) and high temperature service life of each laminated capacitor obtained in the examples and comparative examples were evaluated as follows.

Electrostatic capacitance: The electrostatic capacitance was measured by flowing an electric current of 1 Vrms at 1 kHz. A mean electrostatic capacitance was calculated from measured electrostatic capacitances of 50 pieces of the laminated capacitors.

Q-value: Q-value was measured by flowing the same electric current as used in the measurement of the electrostatic capacitance. A mean Q-value was calculated from the Q-values of 50 pieces of the laminated capacitors.

Insulation resistance (log IR): The insulation resistance was measured by flowing an electric current of 1 W.V. (Working Volt) into the laminated capacitor for 120 seconds at 25° C. A mean insulation resistance was calculated from the insulation resistances of 50 pieces of the laminated capacitors.

High temperature service life: An electric power of 4 W.V. was applied to the laminated capacitor at a temperature of 150° C. and after 500 hours of the time had lapsed, the insulation resistance was measured. When the insulation resistance was decreased to 10,000 MΩ or less, the capacitor was judged to have poor high temperature service life. The test was carried out with respect to 18 pieces of the laminated capacitors for respective examples and comparative examples. The results are shown in TABLE 2.

The ceramic sintered body of each laminated capacitor was cut, and the structure and composition of the cross section were investigated by a micro X-ray diffraction method, observing the presence of $CaZrO_3$, $MnO_2$ and $TiO_2$.

TABLE 2

| | EXAMPLE | | | COMPARATIVE EXAMPLE | |
|---|---|---|---|---|---|
| | 1 | 2 | 3 | 1 | 2 |
| ELECTROSTATIC CAPACITANCE (nF) | 95 | 105 | 95 | 80 | 95 |
| Q-VALUE | 5000 | 5100 | 5000 | 500 | 5000 |
| INSULATION RESISTANCE (log IR) | 11.5 | 11.6 | 11.5 | 8.0 | 10.5 |
| HIGH-TEMPERATURE SERVICE LIFE | 0/18 | 0/18 | 0/18 | 18/18 | 9/18 |

As is evident from the table, the samples in Comparative Example 1 had a considerably lower electrostatic capacitance of 80 nF than the design electrostatic capacitance, as well as a lower Q-value of 500. The insulation resistance (log IR) also showed a lower value of 8.0. Also, all of the 18 pieces of the laminated capacitors in Comparative Example 1 did not pass the high temperature service life test.

Although the electrostatic resistance and Q-value of the sample in Comparative Example 2 were in the same level as those of the sample in Example 1, the insulation resistance (log IR) was as low as 10.5 and 9 pieces of the 18 pieces of the laminated capacitors did not pass the high temperature service life test.

The samples in Example 1 had, on the contrary, a high electrostatic capacitance and Q-value as well as an insulation resistance (log IR) of as high as 11.5. In addition, there were no samples that did not pass the high temperature service life test.

It can be understood that the high electrostatic capacitance and Q-value are enhanced in the samples in Example 2 as compared with the samples in Example 1, probably due to formation of the $TiO_2$ phase as a result of addition of $SrTiO_3$ in the sintered body.

It is evident from the comparison between Examples 1 to 3 and Comparative Examples 1 and 2 that the Q-value and the high temperature service life have been improved by forming the $MnO_2$ phase and glass phase in the ceramic sintered body.

While the method for manufacturing the laminated ceramic capacitor was described in the foregoing examples, the method can be also applied to other laminated ceramic electronic components using $CaZrO_3$ based ceramics.

As is evident from the foregoing examples, the laminated ceramic electronic component according to the present invention are obtained by firing in a neutral or reducing atmosphere at a relatively low temperature because the ceramic sintered body mainly comprises $CaZrO_3$ besides containing a $MnO_2$ phase and glass phase. Accordingly, inner electrodes comprising a base metal such as Ni and Cu can be used, thereby enabling a relatively cheap laminated ceramic electronic component to be provided by taking advantage of the $CaZrO_3$ based ceramics having, for example, a small rate of temperature change of electrostatic capacitance.

The high temperature service life of the ceramic sintered body is improved by forming the $MnO_2$ phase, and thereby the laminated ceramic electronic component can be securely operated at high temperature.

Adding the glass phase not only improves the insulation resistance but also enables the ceramic sintered body to be sintered at a low temperature, serving for reducing the energy cost in firing.

When the ceramic sintered body contains the $TiO_2$ phase in the present invention, the specific dielectric constant of the ceramic sintered body becomes high to enable the laminated ceramic electronic component having higher electrostatic capacitance and Q-value to be obtained.

The present invention can be advantageously applied to the temperature compensation capacitor, because the $CaZrO_3$ based ceramics having a small rate of temperature change of electrostatic capacitance are used. The cost for the inner electrodes is reduced when a base metal such as Ni and Cu are used, thereby enabling the cost of the laminated ceramic electronic component to be reduced.

What is claimed is:

1. A laminated ceramic electronic component comprising:

a ceramic sintered body consisting essentially of $CaZrO_3$ containing a $MnO_2$ phase and a glass phase;

inner electrodes comprising a base metal disposed in the ceramic sintered body; and outer electrodes on the outer surface of the ceramic sintered body.

2. A laminated ceramic electronic component according to claim 1, wherein the ceramic sintered body contains a $TiO_2$ phase.

3. A laminated ceramic electronic component according to claim 2, wherein the base metal is Ni or Cu.

4. A laminated ceramic electronic component according to claim 1, wherein the base metal is Ni or Cu.

5. A laminated ceramic electronic component according to claim 1, wherein the $MnO_2$ phase is about 0.5 to 1.5 weight percent based on the weight of the $CaZrO_3$.

6. A laminated ceramic electronic component according to claim 1, wherein the glass phase does not exceed 0.5 weight percent based on the weight of the $CaZrO_3$.

7. A laminated ceramic electronic component according to claim 2, wherein the $TiO_2$ phase is about 0.5 to 1.5 weight percent based on the weight of the $CaZrO_3$.

8. An electronic component containing a temperature compensation laminated capacitor according to claim 7.

9. An electronic component containing a temperature compensation laminated capacitor according to claim 6.

10. An electronic component containing a temperature compensation laminated capacitor according to claim 5.

11. An electronic component containing a temperature compensation laminated capacitor according to claim 4.

12. An electronic component containing a temperature compensation laminated capacitor according to claim 3.

13. An electronic component containing a temperature compensation laminated capacitor according to claim 2.

14. An electronic component containing a temperature compensation laminated capacitor according to claim 1.

15. A laminated ceramic electronic component comprising:

a ceramic sintered body consisting of $CaZrO_3$ containing a $MnO_2$ phase and a glass phase;

inner electrodes comprising a base metal disposed in the ceramic sintered body; and outer electrodes on the outer surface of the ceramic sintered body.

* * * * *